United States Patent
Dion

(10) Patent No.: US 6,627,266 B2
(45) Date of Patent: Sep. 30, 2003

(54) COLOR CUSTOMIZATION FOR PAINT APPLICATION ASSEMBLY

(75) Inventor: Mark E. Dion, St. Clair Shores, MI (US)

(73) Assignee: Behr Systems, Inc., Auburn Hills, MI (US)

( * ) Notice: Subject to any disclaimer, the term of this patent is extended or adjusted under 35 U.S.C. 154(b) by 133 days.

(21) Appl. No.: 09/881,750

(22) Filed: Jun. 15, 2001

(65) Prior Publication Data

US 2002/0192357 A1 Dec. 19, 2002

(51) Int. Cl.$^7$ ................................................ B05D 1/02
(52) U.S. Cl. ...................................................... 427/421
(58) Field of Search .......................................... 427/421

(56) References Cited

U.S. PATENT DOCUMENTS 4,723,712 A * 2/1988 Egli et al. .................... 237/307

* cited by examiner

*Primary Examiner*—Bernard Pianalto
(74) *Attorney, Agent, or Firm*—Howard & Howard

(57) ABSTRACT

A method of painting a product in a production painting facility includes the steps of selecting a hue and a chroma corresponding to the hue. The production painting facility utilizes a plurality of base paints that are mixable to constitute the hue and chroma selected. The base paints are pumped to a blending device in a ratio determined to be necessary to formulate the hue and chroma selected. The base paints are blended in the blending device according to the predetermined ratio forming a secondary paint having the hue and chroma previously selected. The secondary paint is delivered to a paint applicator such as an atomizer bell or an equivalent and is applied to the product being painted. The base paints are mixed at the production facility to create a virtually limitless number of secondary paint colors with only a limited number of base paints.

15 Claims, 4 Drawing Sheets

(1 of 4 Drawing Sheet(s) Filed in Color)

COLOR CUSTOMIZATION FOR PAINT APPLICATION ASSEMBLY

BACKGROUND OF THE INVENTION

The present invention relates generally to an apparatus for painting products in a production setting. More specifically, the present invention relates to an apparatus for mixing primary paints, each having a separate base color to form a secondary paint, having a predetermined a color at a production painting facility.

Presently, production painting facilities, such as, for example a facility that paints automotive vehicle bodies, is limited to painting only a limited number of colors. A typical production paint facility includes a plurality of paint feed tanks each having a predetermined color of paint that is pumped to a paint applicator. Proximate to the paint applicator is a valving system actuated by a controller that determines which color of paint will be delivered to the paint applicator. The applicator is programmed with a purge cycle during which solvent and air is run through the paint applicator when changing the color to be applied to the vehicle body. Due the complexity of the valving system required to change paint colors during the production process only a limited number of colors has been made available as choices to the purchasing consumer. Therefore, the consumer has only a limited number of color options available to choose from when trying to individualize the vehicle being purchased.

The introduction of the internet to the vehicle selection and purchasing process has made available to the consumer the possibility of making individualized selections not typically available at an auto dealership. For example, many web sites now provide the consumer the ability to select a particular color and view the vehicle of their choice in that color. Further, some manufacturers are providing the ability to select this and other options such as interior fabrics and color and to purchase the vehicle on line.

It would be desirable to increase the number of colors available to the consumer so that the consumer can individualize the color of his or her vehicle. Further, it would be desirable to combine the ability to select both a hue and chroma that would produce a color that no other consumer could select unless that exact hue and chroma was also chosen. However, given the limitations of the currently available paint application apparatus, the ability to select these individualized colors is not feasible.

SUMMARY OF THE INVENTION AND ADVANTAGES

The present invention is an apparatus for painting a product, such as, for example, an automotive vehicle body, in a production painting facility with a virtually unlimited number of colors. The apparatus includes a plurality of feed tanks each holding a base paint with a different primary color. At least one paint feed pump is connected to each paint feed tank for pumping the base paint from the tank. Each feed pump pumps a corresponding base paint to a blending device. The blending device receives these base paints at a predetermined ratio and mixes the base paints to form a secondary paint having a predetermined color corresponding to the predetermined ratio. A production paint applicator receives the secondary paint from the blending device under pressure and applies the paint to the vehicle body.

The predetermined color is selected by the product purchaser by selecting a corresponding hue and chroma from a color wheel. A controller is programmed with the color formula corresponding to a particular hue and chroma. Upon selection of the hue and chroma, the controller activates the paint feed pumps to pump the combination of base paints corresponding to the formula for the selected hue and chroma to the controller. The apparatus of the present invention provides the ability to mix a limited number of base paints, each having a primary color to form a relatively infinite number of secondary colors corresponding to a given hue and chroma selected by a consumer. This provides a manufacturer with the ability to offer a product in virtually any color a consumer desires. Further, additional paints having either micas or metallic flake can also be blended with the primary paints to further differentiate a color corresponding to the hue and chroma selected.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
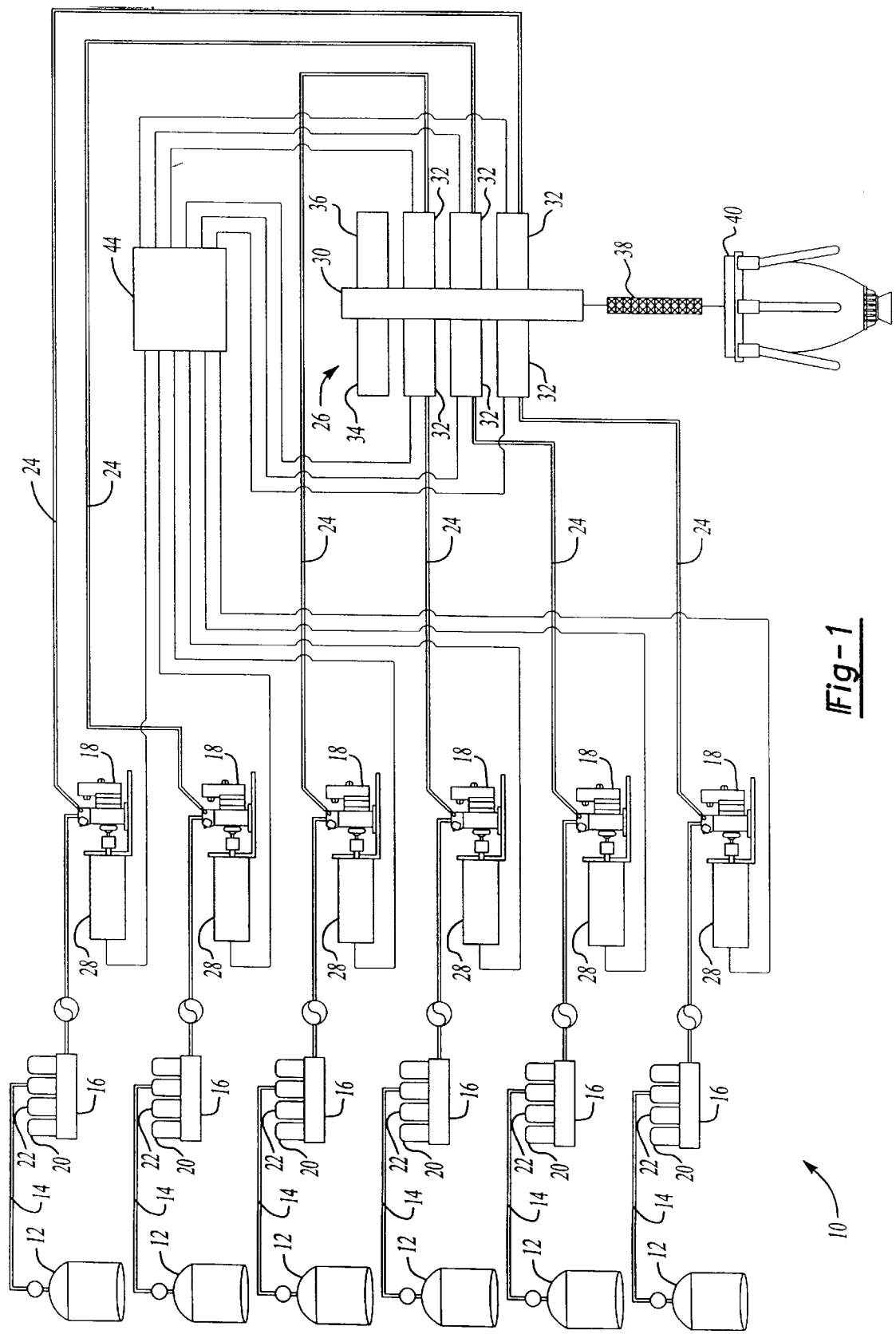
FIG. 1 is a schematic view of the color customization apparatus of the present invention.

A schematic of an apparatus for painting a product, for example a vehicle body in a production painting facility, is generally shown at 10 of FIG. 1. The apparatus 10 includes a plurality of feed tanks 12, preferably pressurized, as is known in the art of production painting. Each feed tank 12 holds a primary color such as, for example, red, yellow, blue, white, and black. An additional tank 12 holding a clear paint is also optionally included. The clear paint is typically utilized for a two coat paint system. The two coat system includes a colored base coat and a clear overcoat of paint. Each tank communicates through a paint feed line 14 and a purge valve 16 to a paint feed pump 18. Each purge valve 16 includes a solvent nozzle 20 and an air nozzle 22 for purging paint from the feed line 14 as needed for cleaning. Each paint feed pump 18 pumps a corresponding base paint through a pump feed line 24 to a blending device 26.

Preferably, the paint feed pumps 18 comprise positive displacement gear pumps. Positive displacement gear pumps have proven to have both accurate and durable operating properties for delivering an accurate amount of base paint to the blending device 26. The preferred gear pumps are supplied by Barmag AG and operate at at least 3.0 cc's per revolution. Additionally, the pressure differential across the gears are balanced at approximately ±20 psi. A servo motor 28 operates the pump 18 controlled in a velocity loop and is self adjusting to maintain a constant speed. Other equivalent paint feed pumps capable of metering precise amounts of paint may also be used.

A manifold 30 receives the base paint from each of the paint feed pumps 18 through the pump feed lines 24. Each pump feed line 24 includes a manifold valve 32 that opens or closes corresponding to which of the paint feed pumps 18 is being activated. A solvent manifold valve 34 and an air manifold valve 36 are also disposed on the manifold 30 for purging and cleaning the blending device 26 during a color change as is known in the art of production painting. A mix tube 38 receives paint from the manifold 30. The mix tube 38 includes a spiraled inner wall for mixing the base paints received from the manifold 30. The mix tube 38 delivers the mixed primary paints now comprising the secondary paint to a paint applicator 40 such as a rotary atomizer paint bell as is known in the art of production painting. Other types of paint applicators may be utilized as desired, such as, for example air atomizers.

Figure 4:
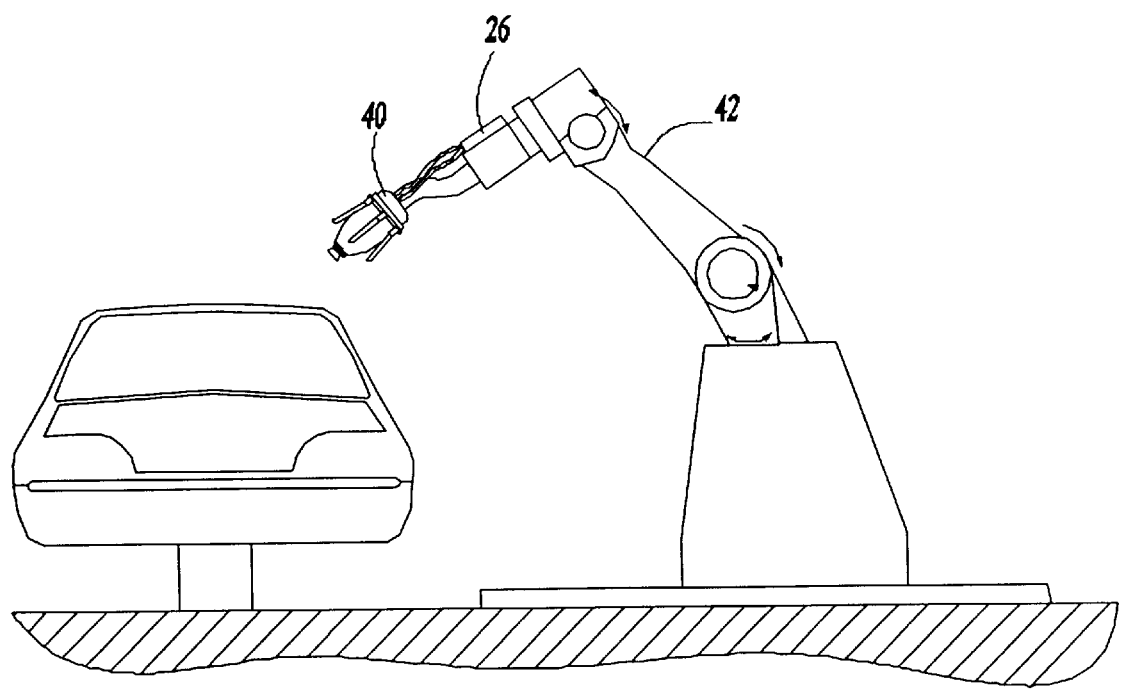
FIG. 4 is schematic view of a robot arm supporting the blending device of the present invention.

Preferably, the blending devices are affixed a robot arm 42 (FIG. 4), the end of which supports the paint applicator 40. A controller 44 interfaces with each of the paint feed pumps 18, each of the manifold valves 32, the robot arm 42, and the applicator 40. The controller 44 coordinates the metering of the base paints and the application of the secondary paint corresponding to the hue and chroma selected by the customer as will be explained further below.

Preferably, the manifold valves 30 are pneumatically actuated by pressurized air lines as directed by the controller 44. Needles (not shown) disposed within the manifold valves 30 are actuated by the air lines to open the valves 30 facilitating the flow of paint from the pump feed lines 24 into the manifold 30. The controller activates the paint feed pump 18 corresponding to the base paints needed to blend the secondary paint simultaneously with opening the corresponding manifold valves 32. The period of time each pump 18 is activated to deliver the appropriate ratio of base paint necessary to blend the predetermined color is calculated by the controller.

Figure 2:
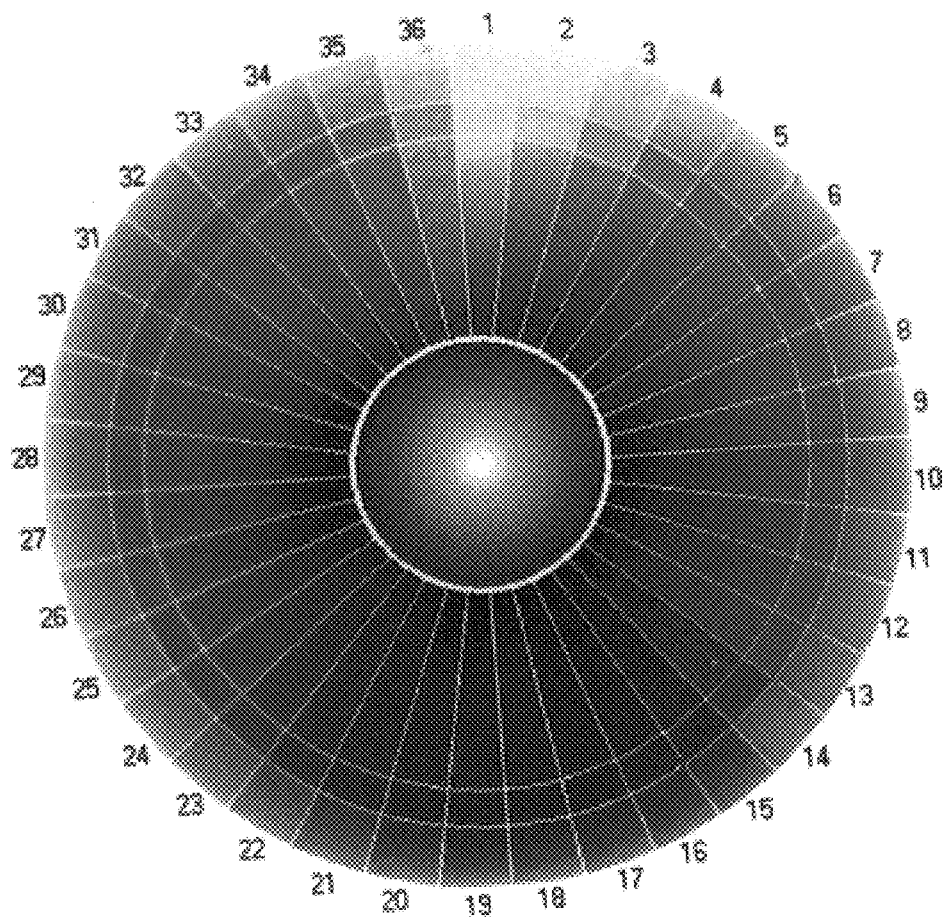
FIG. 2 is color drawing of the color wheel utilized to select a hue and chroma.

Referring to FIG. 2, a color chart represented as a color wheel is generally shown at 46. A hue and a corresponding chroma can be selected from the color wheel 46 to obtain a desired secondary color. The color wheel 46 can be located on a web page of a marketing site on the internet or be part of a computer package at a dealership or marketing outlet. Each secondary color corresponds to a specific point selected on the color wheel. The selected point is signaled to the controller 44, which performs an algorithm to determine the ratio of base paints needed to be mixed together to blend the secondary color. After determining the ratio of base paints necessary to blend the secondary color, the controller 44 signals the corresponding paint feed pumps 18 and the corresponding manifold valves 32 to deliver the precise ratio of base paints to the blending device 26 required to mix the secondary paint. Additionally, a metallic or mica-based paint can be included to further differentiate the predetermined color. The mica and metallic paints can be selected by indicating so on the computer used to select the predetermined color.

In the case of a modular paint booth, wherein a single paint application station is included, one of the tanks 12 can be designated to a clear coat paint. Therefore, a two coat, base coat clear coat paint system can be applied to the vehicle body in two stages using a single applicator 40. First, the predetermined color is applied as a base coat paint selected from the color wheel 46. Subsequently, the clear coat paint is applied over the base coat paint to establish the base coat clear coat paint coating. Additional tanks 12 can be designated to add a mica containing clear coat or blend a mica paint to the clear coat paint or other base paints as desired.

Figure 3:
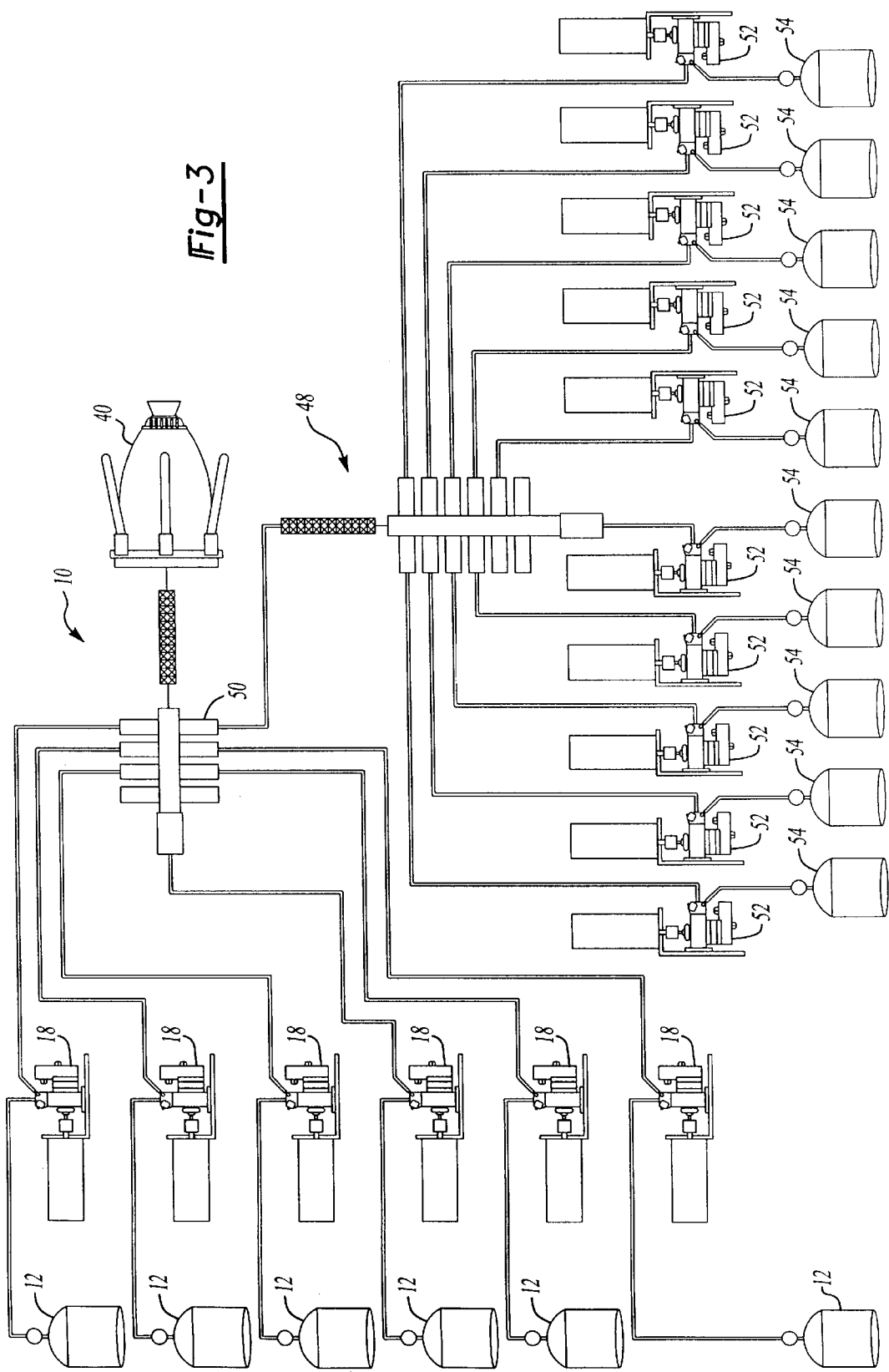
FIG. 3 is an alternative embodiment of the color customization apparatus of the present invention.

Referring to FIG. 3, a secondary blending device, generally shown at 48, feeds a blending manifold valve 50 disposed upon the apparatus 10. The secondary blending device 48 includes a plurality of secondary paint feed pumps 52. The secondary paint feed pumps 52 pump various colored micas, various grades of metallic flake, clear coat, and other paints having unique properties, each from secondary paint tanks 54. These paints are pumped to a secondary blending device 56 of similar construction as the blending device 26 discussed above. The secondary blending device 56 is connected to the blending manifold valve 50 and thereby delivers premixed specialty paint to the blending device 26 to be mixed with the primary paints. Alternatively, the specialty paints are not mixed with the primary paints and are used for a secondary or tertiary paint coating on the vehicle body. The secondary apparatus 48 provides the flexibility to enable further distinguishing characteristics to the painted vehicle body and yet, utilize the same applicator 40 eliminating the need to install additional applicators 40 in the paint processing booth.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of painting a product in a production painting facility comprising the steps of:
    selecting a hue and a chroma;
    providing a controller programmable to determine a color associated with said selected hue and chroma;
    providing a production painting facility with a plurality of base paints mixable to constitute a secondary paint thereby producing said color associated with said hue and chroma;
    providing a blending device for blending the plurality of base paints;
    delivering the plurality of base paints to said blending device in a ratio determined by said controller to produce said secondary paint having a color associated with the hue and chroma;
    blending the plurality of base paints in said blending device according to a predetermined ratio determined by said controller to form the secondary paint having the hue and chroma previously selected;
    delivering the secondary paint to an applicator; and
    applying the secondary paint received from said blending device to a product.

2. A method as set forth in claim 1 further including the step of predetermining the ratio of base paints corresponding to the selected hue and chroma.

3. A method as set forth in claim 2 further including the step of signaling the blending device with the ratio of base paints corresponding to the selected hue and chroma.

4. A method as set forth in claim 3 further including the step of purging and cleaning the blending device in response to a selection of a new hue and chroma.

5. A method as set forth in claim 1 wherein said step of blending base paints is further defined by blending at least red, yellow, blue, white, and black.

6. A method as set forth in claim 1 wherein said step of selecting a hue and a chroma further includes selecting a mica based paint to blend with the base paints.

7. A method as set forth in claim 6 wherein said step of selecting a hue and a chroma further includes selecting a metallic base paint to blend with the base paints.

8. A method of painting a product in a production painting facility comprising the steps of:

selecting a hue and a chroma corresponding to the hue from a color chart disposed at a remote location;

providing a controller programmable to determine a color associated with said selected hue and chroma and signaling said controller from the remote location;

providing a production painting facility with a plurality of base paints mixable to constitute a secondary paint having a color derived from an unlimited combination of hues and chromas;

providing a blending device for blending the plurality of base paints;

delivering the plurality of base paints to said blending device in a ratio determined by said controller to produce said secondary paint having a color associated with the hue and chroma;

blending the plurality of base paints in said blending device according to a predetermined ratio to form the secondary paint having the hue and chroma previously selected;

delivering the secondary paint to an applicator; and applying the secondary paint received from said blending device to a product.

9. A method as set forth in claim 8 further including the step of predetermining the ratio of base paints corresponding to the selected hue and chroma.

10. A method as set forth in claim 9 further including the step of signaling the blending device with the ratio of base paints corresponding to the selected hue and chroma.

11. A method as set forth in claim 8 further including the step of purging and cleaning the blending device in response to a selection of a new hue and chroma.

12. A method as set forth in claim 8 wherein said step of blending base paints is further defined by blending at least red, yellow, blue, white, and black.

13. A method as set forth in claim 8 further including the step of selecting a mica based paint to blend with the base paints.

14. A method as set forth in claim 8 further including the step of selecting a mica based paint to apply over said secondary paint.

15. A method as set forth in claim 8 wherein said step of selecting a hue and a chroma further includes selecting a metallic base paint to blend with the base paints.

* * * * *

(12) EX PARTE REEXAMINATION CERTIFICATE (5780th)
United States Patent
Dion

(10) Number: US 6,627,266 C1
(45) Certificate Issued: Jun. 12, 2007

(54) COLOR CUSTOMIZATION FOR PAINT APPLICATION ASSEMBLY

(75) Inventor: Mark E. Dion, St. Clair Shores, MI (US)

(73) Assignee: Behr Systems, Inc., Auburn Hills, MI (US)

Reexamination Request:
No. 90/007,414, Feb. 9, 2005

Reexamination Certificate for:
Patent No.: 6,627,266
Issued: Sep. 30, 2003
Appl. No.: 09/881,750
Filed: Jun. 15, 2001

(51) Int. Cl.
B01F 13/00 (2006.01)
B01F 13/10 (2006.01)
B01F 15/00 (2006.01)
B05B 7/24 (2006.01)
B05B 7/32 (2006.01)

(52) U.S. Cl. .................... 427/402; 427/426; 427/427.2; 427/427.5

(58) Field of Classification Search .................. None
See application file for complete search history.

(56) References Cited

U.S. PATENT DOCUMENTS

| | | | |
|---|---|---|---|
| 1,948,401 A | 2/1934 | Smith et al. | |
| 2,564,392 A | 8/1951 | Burrucker | |
| 3,135,467 A | 6/1964 | Greenman | |
| 3,303,970 A | 2/1967 | Breslau et al. | |
| 4,397,422 A | 8/1983 | Gwyn | |
| 4,546,922 A | 10/1985 | Thometz | |
| 4,665,394 A * | 5/1987 | Coles et al. | 340/815.67 |
| 4,723,712 A | 2/1988 | Egli et al. | |
| 4,874,131 A | 10/1989 | Sanchez-Robles et al. | |
| 4,876,111 A | 10/1989 | Guyomard et al. | |
| 5,225,239 A | 7/1993 | Ostin | |
| 5,270,806 A * | 12/1993 | Venable et al. | 358/500 |
| 6,238,746 B1 | 5/2001 | Fukuoka et al. | |
| 6,296,706 B1 | 10/2001 | Dattilo | |
| 6,544,588 B2 * | 4/2003 | Yamamori et al. | 427/261 |
| 6,627,266 B2 | 9/2003 | Dion | |

FOREIGN PATENT DOCUMENTS

| | | |
|---|---|---|
| EP | 61171527 | 2/1986 |
| EP | 04171068 | 6/1992 |
| EP | 06226154 | 8/1994 |
| EP | 10080649 | 3/1998 |
| JP | 02000135459 A * | 5/2000 |

* cited by examiner

*Primary Examiner*—Kiley Stoner

(57) ABSTRACT

A method of painting a product in a production painting facility includes the steps of selecting a hue and a chroma corresponding to the hue. The production painting facility utilizes a plurality of base paints that are mixable to constitute the hue and chroma selected. The base paints are pumped to a blending device in a ratio determined to be necessary to formulate the hue and chroma selected. The base paints are blended in the blending device according to the predetermined ratio forming a secondary paint having the hue and chroma previously selected. The secondary paint is delivered to a paint applicator such as an atomizer bell or an equivalent and is applied to the product being painted. The base paints are mixed at the production facility to create a virtually limitless number of secondary paint colors with only a limited number of base paints.

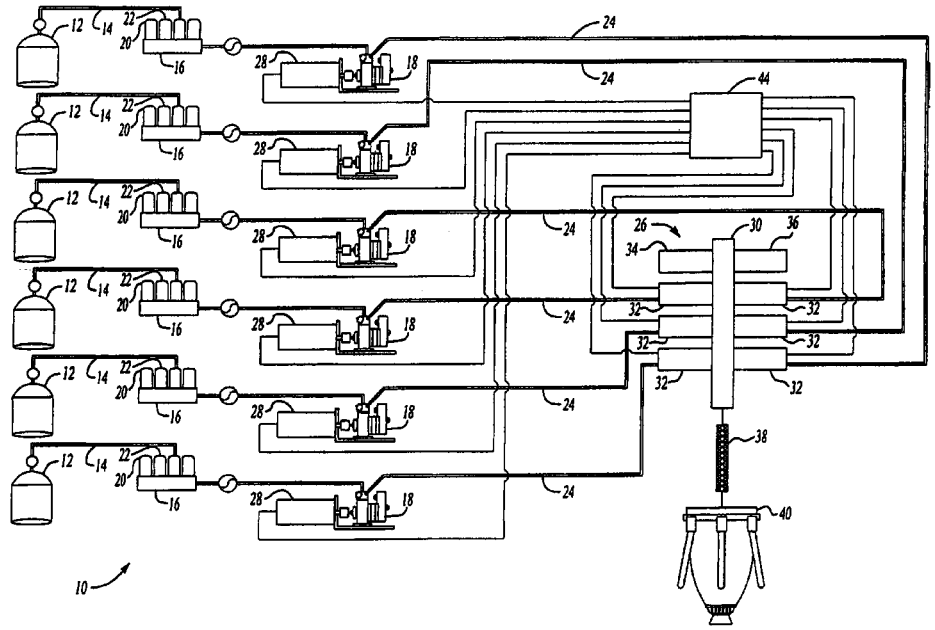

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–15 are cancelled.

* * * * *